3,388,121
TETRAHYDROBENZOCYCLOHEXENE AND CYCLOHEPTENE ETHERS
Edward J. Pribyl, Metuchen, and Jack Bernstein, New Brunswick, N.J., assignors, by mesne assignments, to E. R. Squibb & Sons, Inc., New York, N.Y., a corporation of Delaware
No Drawing. Filed Dec. 16, 1964, Ser. No. 418,877
10 Claims. (Cl. 260—239)

ABSTRACT OF THE DISCLOSURE

Compounds of the formula

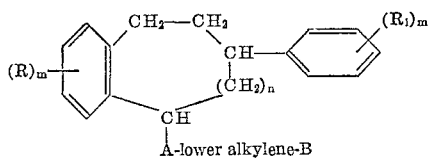

wherein $m$ is 1, 2 or 3, $n$ is 0 or 1, A is oxy or amino, R and $R_1$ are each hydrogen, halogen, lower alkyl, trihalomethyl or lower alkoxy, and B is a basic nitrogen containing radical of less than twelve carbon atoms, and salts thereof, are prepared. These new compounds possess hypotensive activity.

This invention relates to basic ethers of tetrahydrobenzocyclohexenes and tetrahydrobenzocycloheptenes and to salts thereof. More particularly, the invention relates to compounds of the formula (I) 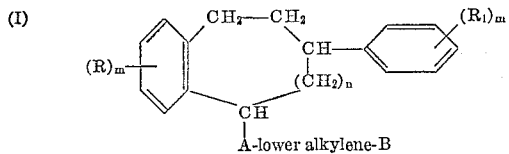

and to acid-addition and quarternary ammonium salts thereof.

The symbol $m$ in Formula I represents 1, 2 or 3 and $n$ represents either 0 or 1.

A represents oxy (—O—) or amino (—NH—).

R and $R_1$ in Formula I each represents hydrogen, halogen, lower alkyl, trihalomethyl or lower alkoxy. All four halogens are within the scope of R and $R_1$, but chlorine and bromine are preferred as elemental halogens, while fluorine is the preferred halogen in the trihalomethyl group. The lower alkyl groups represented by R and $R_1$, the lower alkyl groups which are part of the lower alkoxy substituents represented by R and $R_1$, as well as the lower alkylene groups in the formula, are straight or branched chain aliphatic hydrocarbon radicals having less than eight carbon atoms, including, for example, methyl, ethyl, propyl, isopropyl, butyl, isobutyl, t-butyl, amyl, hexyl and the like. One to four carbon atom groups are preferred.

The symbol B represents a basic nitrogen containing radical of less than twelve carbon atoms which may be represented as

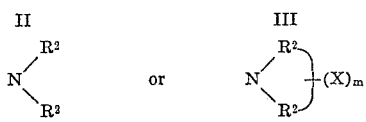

wherein $R^2$ represents hydrogen, lower alkyl, hydroxy-lower alkyl, phenyl-lower alkyl and N-(lower alkyl)phenyl-(lower alkyl) forming such basic groups as amino, lower alkylamino, e.g., methylamino, ethylamino, di(lower alkyl)amino, e.g., dimethylamino diethylamino, dipropylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)-phenyl(lower alkyl)amino, e.g., N-methylbenzylamino and the like.

In addition, the nitrogen may join with the groups represented by $R^2$ as in Formula III to form a five- to seven-membered monocyclic heterocyclic containing, if desired, an oxygen, sulfur or an additional nitrogen atom (no more than two hetero atoms altogether). That is, the two symbols $R^2$ represent together tetramethylene, pentamethylene, hexamethylene, oxatetramethylene, oxapentamethylene, azatetramethylene, azapentamethylene, azahexamethylene, thiatetramethylene or thiapentamethylene. The heterocyclic group may also be substituted by one to three groups represented by X, which includes hydrogen, halogen, lower alkyl, lower alkoxy, hydroxy, hydroxy-lower alkyl, lower alkanoyl, trihalomethyl, nitro, amino and dialkylamino. The symbol $m$ represents 1 to 3 as above.

Thus heterocyclic groups represented by B include, for example, piperidino, (lower alkyl)piperidino, e.g., methylpiperidino, di(lower alkyl)piperidino, e.g., dimethylpiperidino, (lower alkoxy)-piperidino, e.g., methoxypiperidino, 2-, 3- or 4-piperidyl, 2-, 3- or 4-(N-lower alkylpiperidyl), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl)morpholino, e.g., 3 - methylmorpholino or 2 - methylmorpholino, di(lower alkyl)morpholino, e.g., 2,3 - dimethylmorpholino, (lower alkoxy)morpholino, e.g., ethoxymorpholino, thiamorpholino, (lower alkyl)thiamorpholino, e.g., 3 - methylthiamorpholino or 2 - methylthiamorpholino, di(lower alkyl)thiamorpholino, e.g., 2,3 - dimethylthiamorpholino, (lower alkoxy)thiamorpholino, e.g., 2 - methoxythiamorpholino, piperazino, (lower alkyl)piperazino, e.g., $N^4$-methylpiperazino, 2 - methylpiperazino or 3 - methylpiperazino, hydroxyalkylpiperazino, e.g., $N^4$ - 2 - hydroxyethylpiperazino, di(lower alkyl)piperazino, e.g., 2,3 - dimethylpiperazino, hexamethyleneimino and homopiperazino.

Preferred are those compounds wherein $n$ is 1, A is oxygen, R and $R_1$ are both hydrogen and B is di(lower alkyl)amino, especially dimethylamino. The lower alkylene group preferably has two carbons.

The new bases of Formula I form acid-addition salts by reaction with the common inorganic and organic acids. Such inorganic salts as the hydrohalides, e.g., hydrobromide, hydrochlorides, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl(lower alkyl)halides and sulfates such as benzyl sulfate, etc. This is accomplished by reacting the base with the alkyl halide, sulfate, or the like.

The compounds of Formula I are obtained in both cis and trans forms which are within the ambit of this invention.

The compounds of this invention are therapeutically active substances which possess hypotensive activity. They are useful in the treatment of conditions such as hypertension. They may be administered orally or parenterally in the form of tablets, capsules, elixirs, injectables or the like by incorporating the appropriate dosage of the base of Formula I or a physiologically acceptable acid-addition salt or quaternary ammonium salt thereof in a conventional vehicle according to accepted pharmaceutical practice.

The new compounds of Formula I, when A is oxygen, are produced by reducing a compound of Formula IV (IV) 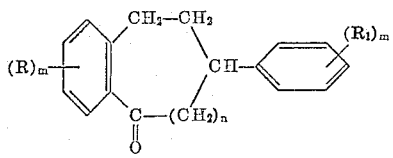

with a mild reducing agent such as sodium borohydride in an organic solvent such as methanol to produce an intermediate of Formula V (V) 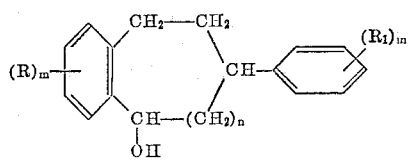

The compound of Formula V is then treated with an alkali metal hydride such as sodium hydride or with sodamide in an aromatic hydrocarbon such as toluene followed by reaction with a compound of Formula VI (VI)  Hal-lower alkylene-B When A is —NH—, the compounds of Formula I are produced by converting the starting material of Formula IV with hydroxylamine or its acid salt to the oxime of Formula VII (VII) 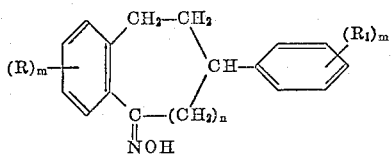

which is then reduced with an alkali metal reducing agent such as lithium aluminum hydride in a medium such as an ether, e.g., ethyl or isopropyl ether or a cyclic ether such as tetrahydrofuran to obtain a compound of Formula VIII (VIII) 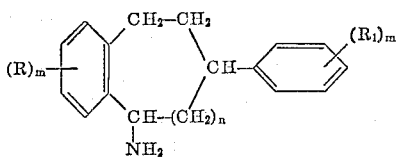

The intermediate of Formula VIII is then converted with a haloacylhalide such as chloracetyl chloride, bromoacetyl bromide, chloropropionyl chloride or the like in the presence of basic agent such as triethylamine to a compound of Formula IX (IX) 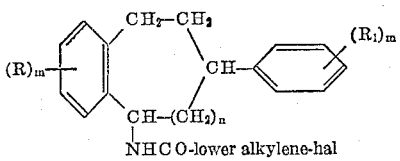

The intermediate of Formula IX is then reacted with an amine of the formula

HB in the presence of a reducing agent such as lithium aluminum hydride in an aromatic hydrocarbon solvent such as toluene to obtain the product of Formula I wherein A is amino.

In all the formulas, the symbols have the same meaning as in Formula I and hal represents halogen, preferably chlorine or bromine.

The following examples are illustrative of the invention, all temperatures being in degrees centigrade.

Example 1.—Trans-N,N-dimethyl-2-(6,7,8,9-tetrahydro-7-phenyl-5H - benzocyclohepten - 5 - yloxy)ethylamine, oxalic acid salt (a) Cis and trans 6,7,8,9-tetrahydro-7-phenyl-5H-benzocycloheptene-5-ol.—A solution of 8 g. sodium borohydride in 25 ml. water is added dropwise to a solution of 12.6 g. of 6,7,8,9-tetrahydro-7-phenyl-5H-benzocycloheptene-5-one in 100 ml. of methanol. The mixture is stirred for two hours, diluted with water and filtered. The product (12 g.) is recrystallized from 500 ml. of hexane to give 5.7 g. of the trans material melting between 120–121° C.

The mother liquor is concentrated in vacuo and then distilled to give 4.0 g. of the cis form boiling between 160° and 170° C. at 0.5 mm.

(b) Trans - N,N - dimethyl - 2 - (6,7,8,9 - tetrahydro-7-phenyl-5H-benzocyclohepten-5 - yloxy)ethylamine, oxalic acid salt.—To a solution of 5.7 g. of trans-6,7,8,9-tetrahydro-7-phenyl-5H-benzocycloheptene-5-ol in 75 ml. toluene are added 1.2 g. of 50% sodium hydride in mineral oil. The mixture is heated on the steam bath until the evolution of hydrogen ceases. The mixture is cooled and 2.68 g. dimethylaminoethyl chloride in 30 ml. toluene are added. The mixture is heated for three hours, cooled and filtered. The solvent is removed in vacuo. The residual base is dissolved in ether and added to a solution of 3.0 g. oxalic acid in 200 ml. ether. The solid is filtered off and recrystallized from 500 ml. of butanone to give 3.0 g. of oxalic acid salt melting between 170 and 172° C.

By treating an aliquot of the free base obtained above with methyliodide, the quaternary salt, the methiodide of trans-N,N-dimethyl-2-(6,7,8,9-tetrahydro-7-phenyl-5H-benzocyclohepten-5-yloxy)ethylamine is obtained.

Example 2.—Cis-N,N - dimethyl-2-(6,7,8,9-tetrahydro-7-phenyl - 5H - benzocyclohepten - 5 - yloxy)ethylamine, oxalic acid salt By substituting 4.0 g. cis-6,7,8,9-tetrahydro-7-phenyl-5H-benzocycloheptene-5-ol in the procedure of Example 1(b), there are obtained 2 g. of oxalic acid salt melting between 132 and 134° C.

Example 3.—1-[2-(dimethylamino)ethoxy]-1,2,3,4-tetrahydro-2-phenylnaphthalene, oxalic acid salt To a solution of 5.2 g. 1,2,3,4-tetrahydro-2-phenyl-1-naphthol in 75 ml. toluene are added 1.1 g. of a suspension of 50% sodium hydride in mineral oil. The mixture is heated with stirring on the steam bath for one hour and cooled. A solution of 2.68 g. dimethylaminoethyl chloride is added and the mixture heated on the steam bath for three hours. The mixture is filtered and the toluene removed in vacuo. The residual base (6 g.) is dissolved in ether, filtered and is added to a solution of 2 g. oxalic acid in 150 ml. ether. The product is separated and recrystallized from 50 ml. of butanone to give 1.2 g. of crystalline oxalic acid salt melting between 109 and 111° C.

Example 4.—1-(2-piperidinoethoxy)-1,2,3,4-tetrahydro-2-phenylnaphthalene, oxalic acid salt Substitution of 3.9 g. of 2-piperidinoethyl chloride in the procedure of Example 3 gives 1-(2-piperidinoethoxy)-1,2,3,4-tetrahydro-2-phenylnaphthalene and its crystalline oxalic acid salt.

Example 5.—1 - (2 - hexamethyleniminoethoxy) - 1,2,3,4-tetrahydro-2-phenylnaphthalene, oxalic acid salt Substitution of 4.0 g. of 2-hexamethyleneiminoethyl chloride in the procedure of Example 3, gives 1-[2-hexamethyleneiminoethoxy] - 1,2,3,4 - tetrahydro - 2 - phenyl-naphthalene and its oxalic acid salt.

Example 6.—N,N - diethyl - N' - 2 - [1,2,3,4 - tetrahydro-2-phenyl-1-naphthyl]-ethylenediamine hydrochloride (a) 3,4 - dihydro - 2 - phenyl - 1(2H) - naphthalenone oxime.—A solution of 5 g. of 3,4-dihydro-2-phenyl-1(2H)-naphthalenone and 5 g. of hydroxylamine hydrochloride in 30 ml. of pyridine is heated on the steam bath for one hour. The solution is cooled and poured into water. The solid is filtered and recrystallized from 100 ml. ethanol to give 4.5 g. of a crystalline material melting between 168–169°.

(b) 1,2,3,4-tetrahydro - 2 - phenyl-1-naphthylamine.—A solution of 15 g. of 3,4-dihydro-2-phenyl-1(2H)-naphthalenone oxime in 200 ml. of isopropyl ether is added slowly to a well stirred suspension of 8 g. lithium aluminum hydride in 250 ml. of isopropyl ether over a period of 30 minutes. The mixture is refluxed for 6 hours and allowed to stand for 50 hours. The mixture is decomposed with 5% solution of hydrochloric acid. The ether layer is separated, dried and the solvent removed to give 13 g. of residue. Recrystallization from ethanol gives 6 g. of a tan crystalline material melting between 110–112° C.

(c) 2 - chloro - N - (tetrahydro - 2 - phenyl-naphthyl) acetamide.—To a cold solution of 22 g. of 1,2,3,4-tetrahydro-2-phenyl-1-naphthylamine in 100 ml. of ether containing 10 g. triethylamine is added dropwise a solution of 11 g. of chloroacetyl chloride in 50 ml. of ether. The mixture is stirred for 2 hours. The triethylamine hydrochloride is filtered off. The ether solution is washed with water, dried and the ether removed to give 18 g. of product.

(d) N,N-diethyl-N' - 2 - [1,2,3,4-tetrahydro-2-phenyl-naphthyl]-ethylenediamine hydrochloride.—The above product from (c) is dissolved in 200 ml. of toluene containing 30 g. of diethylamine. This solution is heated in an autoclave at 100° C. for 6 hours. The solution is cooled and filtered. The toluene is removed in vacuo. The residue is dissolved in ether and reacted with lithium aluminum hydride as in the procedure of Example 6(b). The isolated base is dissolved in ether and a crystalline hydrochloride is obtained by treatment with one equivalent of hydrogen chloride in anhydrous ethanol.

Example 7.—N,N-dimethyl-N'-2-[1,2,3,4-tetrahydro-6,7-dimethoxy-2-p-methoxyphenyl-1 - naphthyl]ethylenediamine hydrochloride By replacing the 5 g. of 3,4-dihydro-2-phenyl-(2H)-naphthalenone with 7 g. of 3,4-dihydro-6,7-dimethoxy-2-(p-methoxyphenyl)-1-(2H)-naphthalenone in Example 6, there is obtained N,N-dimethyl-N'-2-[1,2,3,4-tetrahydro-6,7-dimethoxy-2-p-methoxyphenyl-1 - naphthyl]ethylenediamine hydrochloride.

Example 8.—1-[3-(4-methylpiperazino)]propoxy-1,2,3,4-tetrahydro-2-p-methoxyphenyl - 7 - methylnaphthalene, oxalic acid salt (a) 1,2,3,4-tetrahydro-2-p-methoxyphenyl - 7 - methyl-1-naphthol.—A solution of 8 g. of sodium borohydride in 25 ml. of water is added dropwise to a solution of 15 g. of 3,4-dihydro-2-(p-methoxyphenyl) - 7 - methyl - 1(2H)-naphthalenone in 150 ml. of methanol. The mixture is stirred for two hours, diluted with water and filtered. The product is crystallized from aqueous ethanol.

(b) 1-[3-(4-methylpiperazino)]propoxy - 1,2,3,4-tetrahydro-2-p-methoxyphenyl - 7 - methylnaphthalene, oxalic acid salt.—Following the procedure of Example 3 but substituting 1,2,3,4-tetrahydro-2-p-methoxyphenyl-7 - methyl-1-naphthol for 1,2,3,4-tetrahydro-2-phenyl-1-naphthol and N₄-methylpiperazinopropyl chloride for dimethylaminoethyl chloride, there is obtained 1-[3-(4 - methylpiperazino)propoxy]-1,2,3,4-tetrahydro-2 - p-methoxyphenyl-7-methyl naphthalene, oxalic acid salt.

Example 9.—N,N-dimethyl-2-[6,7,8,9 - tetrahydro-7-(o-chlorophenyl)-5H-benzocyclohepten - 5 - yloxy]ethyl-amine, oxalic acid salt By replacing the 6,7,8,9-tetrahydro-7-phenyl-5H-benzocycloheptene-5-one in Example 1 with 6,7,8,9-tetrahydro-7-(o-chlorophenyl)-5H-benzocyclohepten-5 - one, there is obtained N,N-dimethyl-2-[6,7,8,9 - tetrahydro - 7 - (o-chlorophenyl) - 5H - benzocyclohepten - 5 - yloxy]ethyl-amine, oxalic acid salt.

What is claimed is:
1. A compound selected from the group consisting of bases of the formula

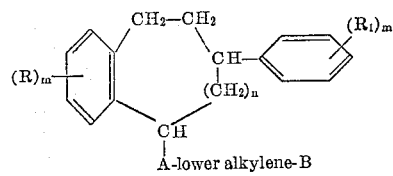

and acid-addition salts and quaternary ammonium salts of said bases, wherein A is a member of the group consisting of oxy and amino, $m$ is a member of the group consisting of 1, 2 and 3, $n$ is a member of the group consisting of 0 and 1, R and $R_1$ each is a member of the group consisting of hydrogen, halogen, lower alkyl and lower alkoxy, and B is a basic nitrogen containing radical of less than twelve carbon atoms selected from the group consisting of amino, lower alkylamino, di(lower alkyl)amino, (hydroxy-lower alkyl)amino, di(hydroxy-lower alkyl)amino, phenyl-(lower alkyl)amino, N-(lower alkyl)-phenyl(lower alkyl)amino, piperidino, (lower alkyl)piperidino, di(lower alkyl)piperidino, (lower alkoxy)piperidino, piperidyl, N-(lower alkyl)piperidyl, pyrrolidino, (lower alkyl)pyrrolidino, di(lower alkyl)pyrrolidino, (lower alkoxy)pyrrolidino, pyrrolidyl, N-(lower alkyl)pyrrolidyl, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiomorpholino, piperazino, (lower alkyl)-piperazino, hydroxyalkylpiperazino, di(lower alkyl)piperazino, hexamethyleneimino and homopiperazino.

2. A compound of the formula

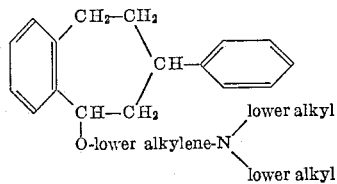

3. N,N-dimethyl-2-(6,7,8,9-tetrahydro - 7 - phenyl-5H-benzocyclohepten-5-yloxy)ethylamine.

4. A compound of the formula

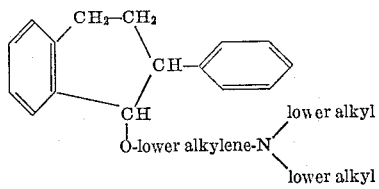

5. 1-(2-dimethylaminoethoxy) - 1,2,3,4 - tetrahydro-2-phenyl-naphthalene.

6. 1-(2-piperidinoethoxy)-1,2,3,4-tetrahydro - 2 - phenyl-naphthalene.

7. 1-(2-hexamethyleneiminoethoxy) - 1,2,3,4 - tetrahydro-2-phenyl-naphthalene.

8. A compound of the formula
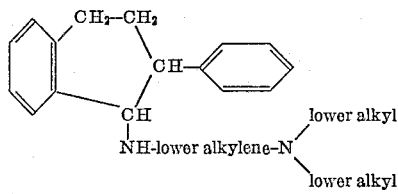
9. N,N-diethyl-N'-2-1,2,3,4-tetrahydro - 2 - phenyl-1-naphthyl-ethylenediamine.
10. A compound of the formula
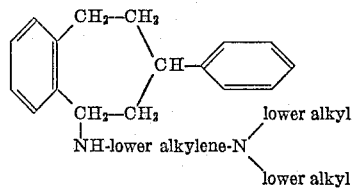
References Cited
UNITED STATES PATENTS
2,681,932   6/1954   Dorn Feld et al. ---- 260—570.7
OTHER REFERENCES
Campbell et al.: CA (1955), p. 5406, vol. 49.
Takahashi et al.: CA (1963), p. 611, vol. 59.
Broquet et al.: Compt. Rend. 258(6), 1820–3, Feb. 10, 1964.
NICHOLAS S. RIZZO, *Primary Examiner.*
ALTON D. ROLLINS, *Examiner.*
B. I. DENTZ, *Assistant Examiner.*